(No Model.) 8 Sheets—Sheet 1.

D. F. GRAHAM.
COMBINED RAKE AND LOADER.

No. 532,744. Patented Jan. 15, 1895.

WITNESSES:

INVENTOR
David F. Graham
BY
ATTORNEYS.

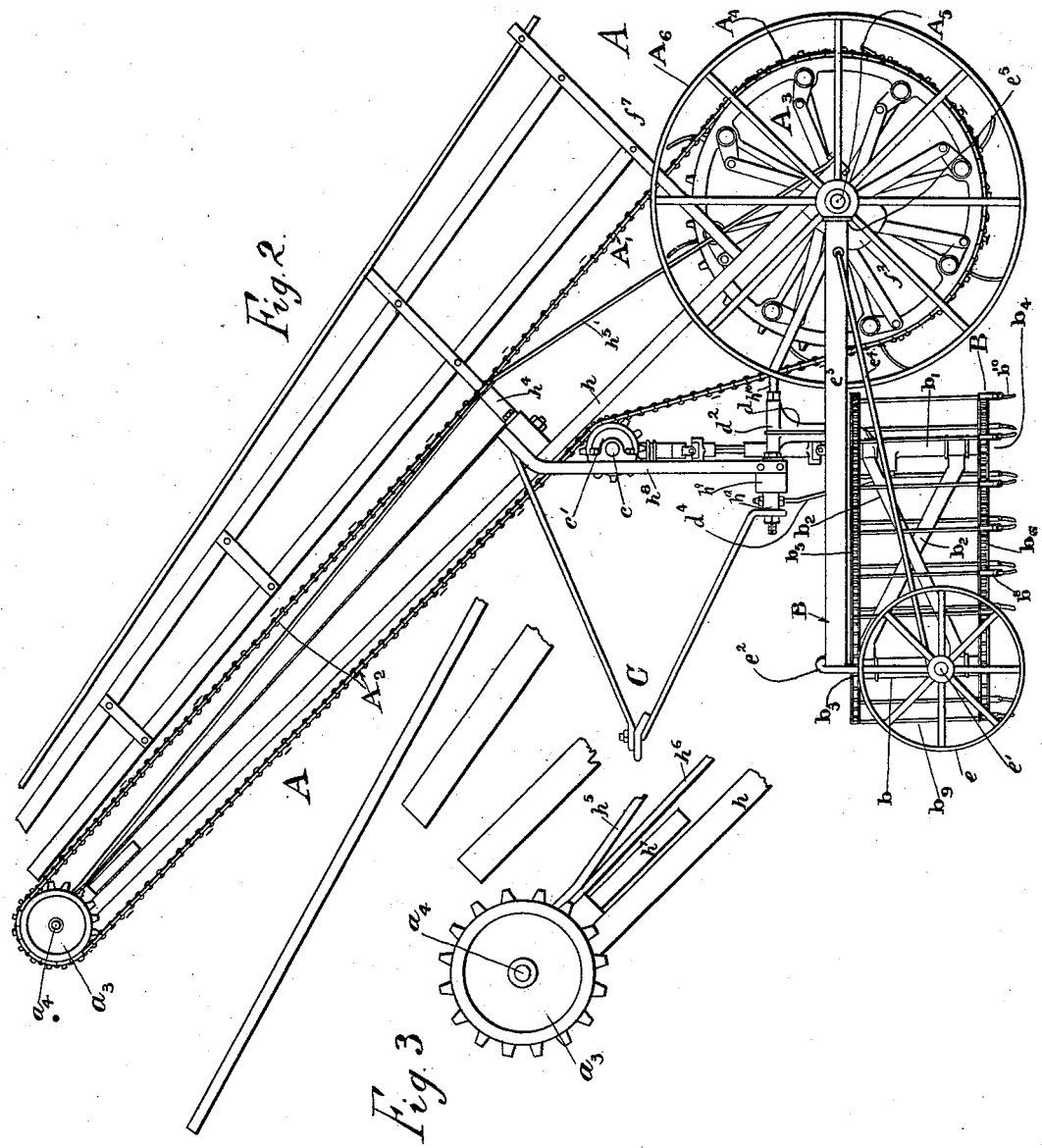

(No Model.)  8 Sheets—Sheet 3.

D. F. GRAHAM.
COMBINED RAKE AND LOADER.

No. 532,744. Patented Jan. 15, 1895.

WITNESSES:

INVENTOR
David F. Graham
BY
ATTORNEYS (No Model.) 8 Sheets—Sheet 4.
D. F. GRAHAM.
COMBINED RAKE AND LOADER.
No. 532,744. Patented Jan. 15, 1895.
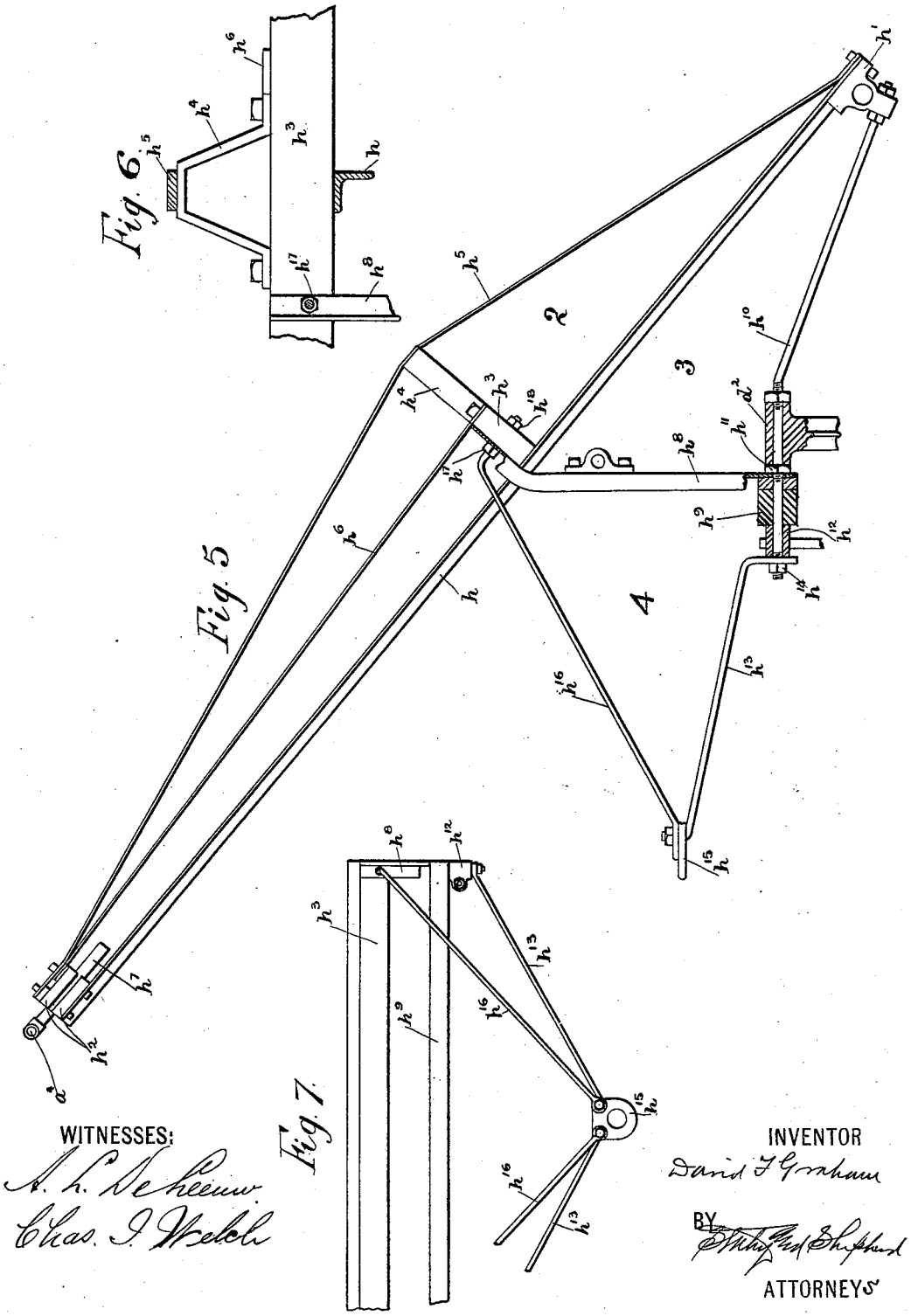

(No Model.) 8 Sheets—Sheet 5.
D. F. GRAHAM.
COMBINED RAKE AND LOADER.
No. 532,744. Patented Jan. 15, 1895.
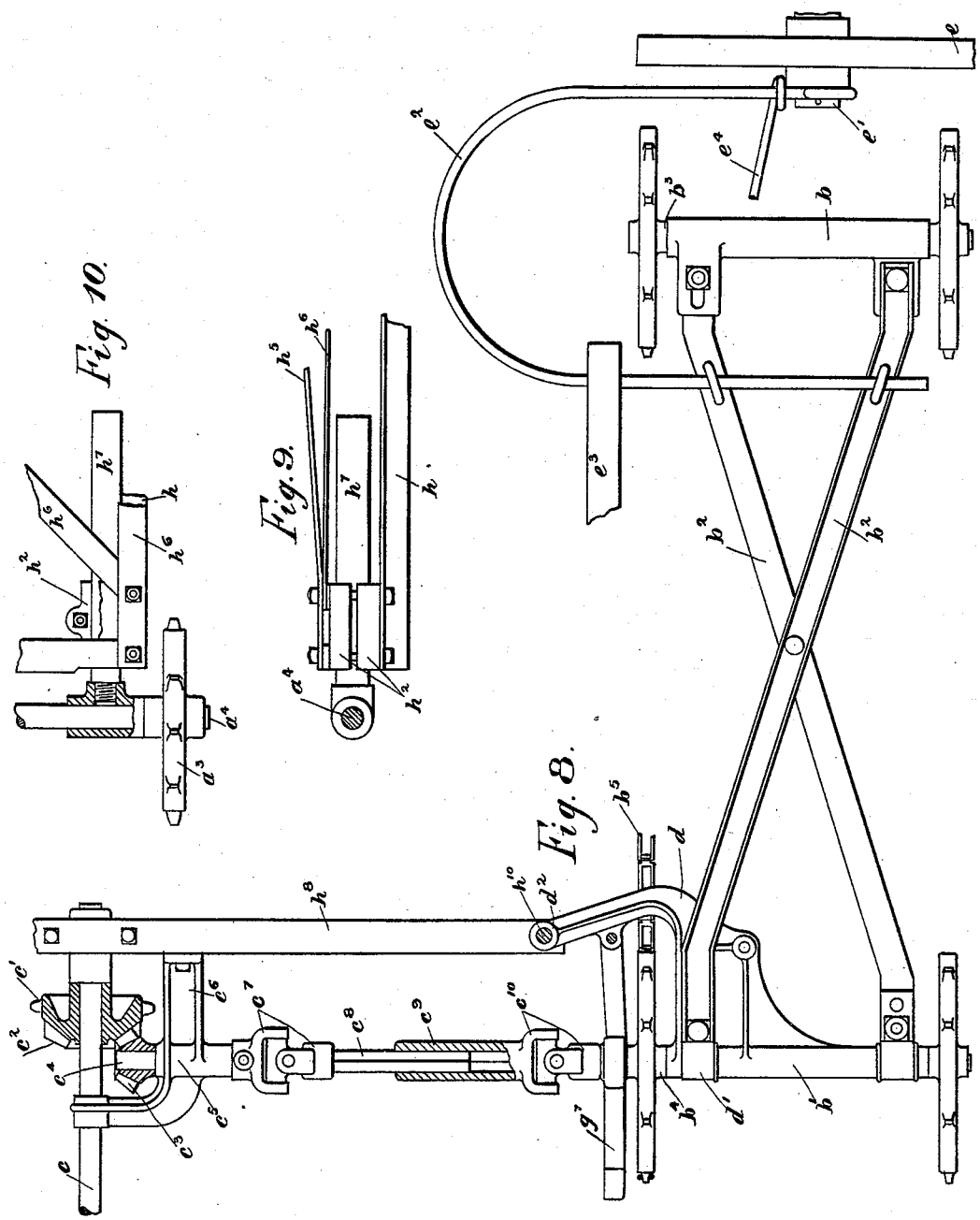
WITNESSES:
INVENTOR
David F. Graham
BY
ATTORNEYS (No Model.) 8 Sheets—Sheet 6.
D. F. GRAHAM.
COMBINED RAKE AND LOADER.
No. 532,744. Patented Jan. 15, 1895.
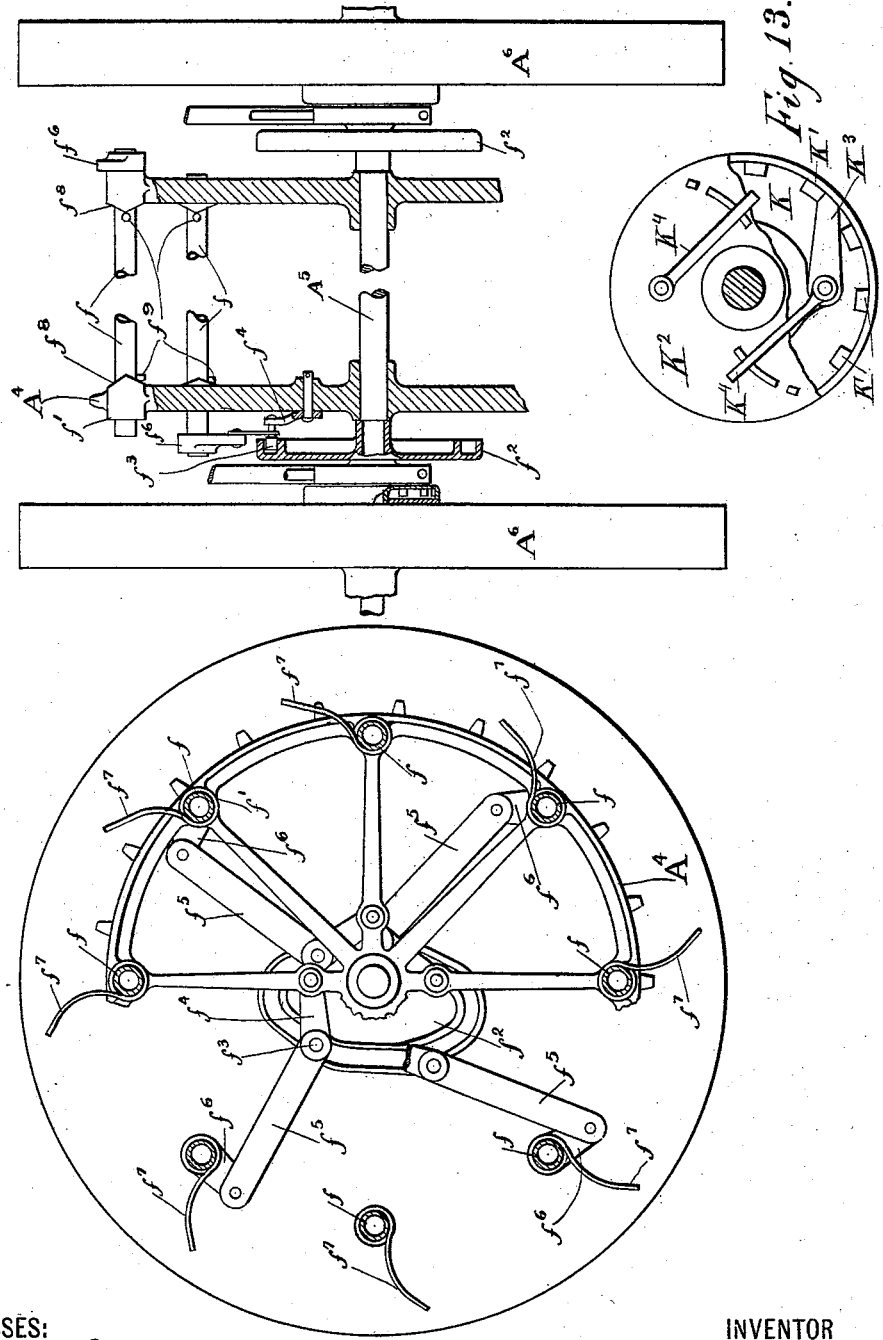
WITNESSES:
INVENTOR
David F. Graham
BY
ATTORNEYS

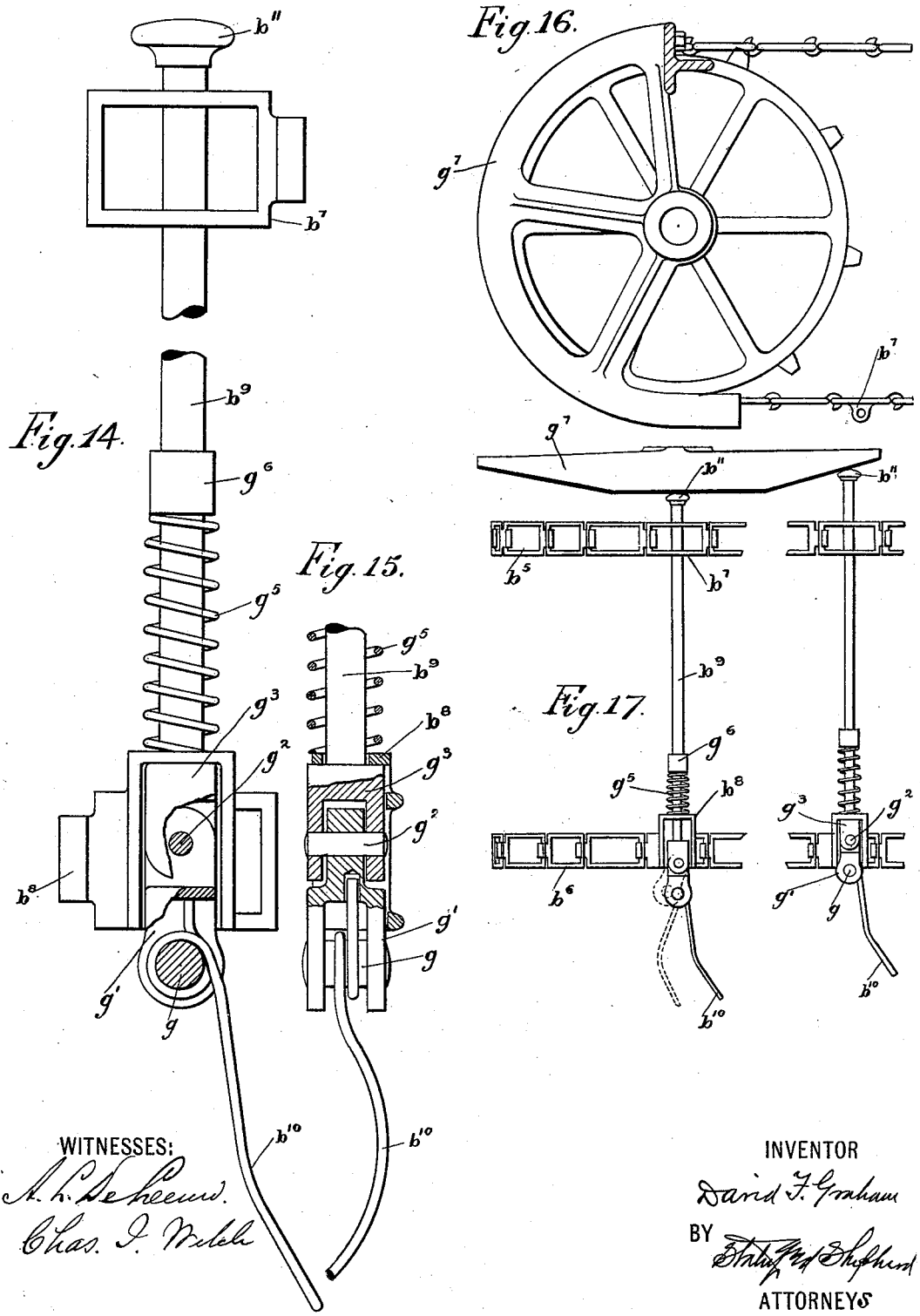

(No Model.) 8 Sheets—Sheet 8.
D. F. GRAHAM.
COMBINED RAKE AND LOADER.
No. 532,744. Patented Jan. 15, 1895.
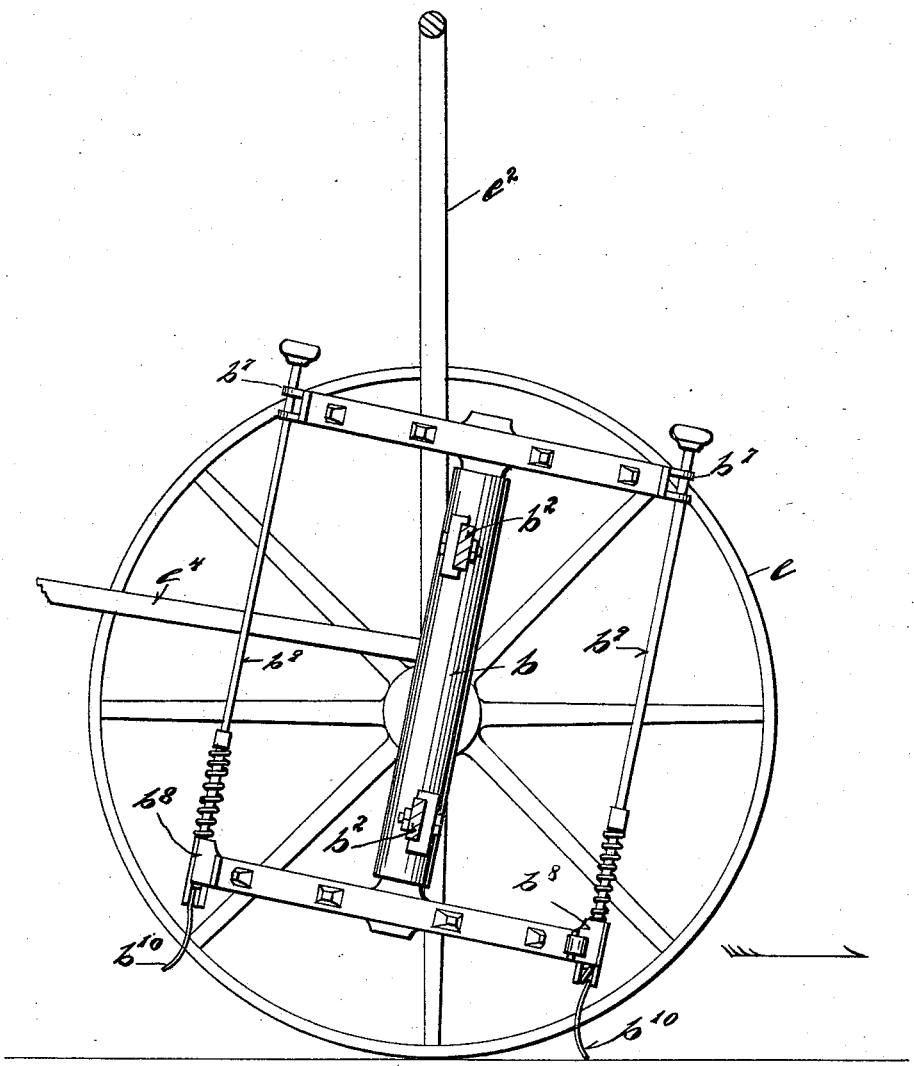

UNITED STATES PATENT OFFICE.

DAVID F. GRAHAM, OF SPRINGFIELD, ASSIGNOR OF ONE-HALF TO THE STODDARD MANUFACTURING COMPANY, OF DAYTON, OHIO.

COMBINED RAKE AND LOADER.

SPECIFICATION forming part of Letters Patent No. 532,744, dated January 15, 1895.

Application filed December 4, 1893. Serial No. 492,677. (No model.)

*To all whom it may concern:*

Be it known that I, DAVID F. GRAHAM, a citizen of the United States, residing at Springfield, in the county of Clark and State of Ohio, have invented certain new and useful Improvements in a Combined Rake and Loader, of which the following is a specification.

My invention relates to a combined hay rake and loader; and the object of my invention is to provide a machine which shall answer the purpose of a hay rake and at the same time combine therewith mechanism for delivering the hay thus raked onto a wagon or other depository.

A further object of my invention is to provide a hay rake having on opposite sides thereof raking devices adapted to move the hay laterally as respects the line of travel of the machine; the raking devices being what may be termed side delivery rakes and adapted to deliver the rakings into the path of the loader which delivers the same onto the wagon or other depository.

A further object of my invention is to provide means by which either one or both of the rakes may be thrown out of operation and the loader operated simply as a loader, or with one, only, of the raking devices.

My invention consists of a hay loader having combined therewith side delivery raking devices; the parts being all connected together for joint operation.

My invention further consists in the various constructions and combinations of parts hereinafter described and pointed out in the claims.

Figure 1:
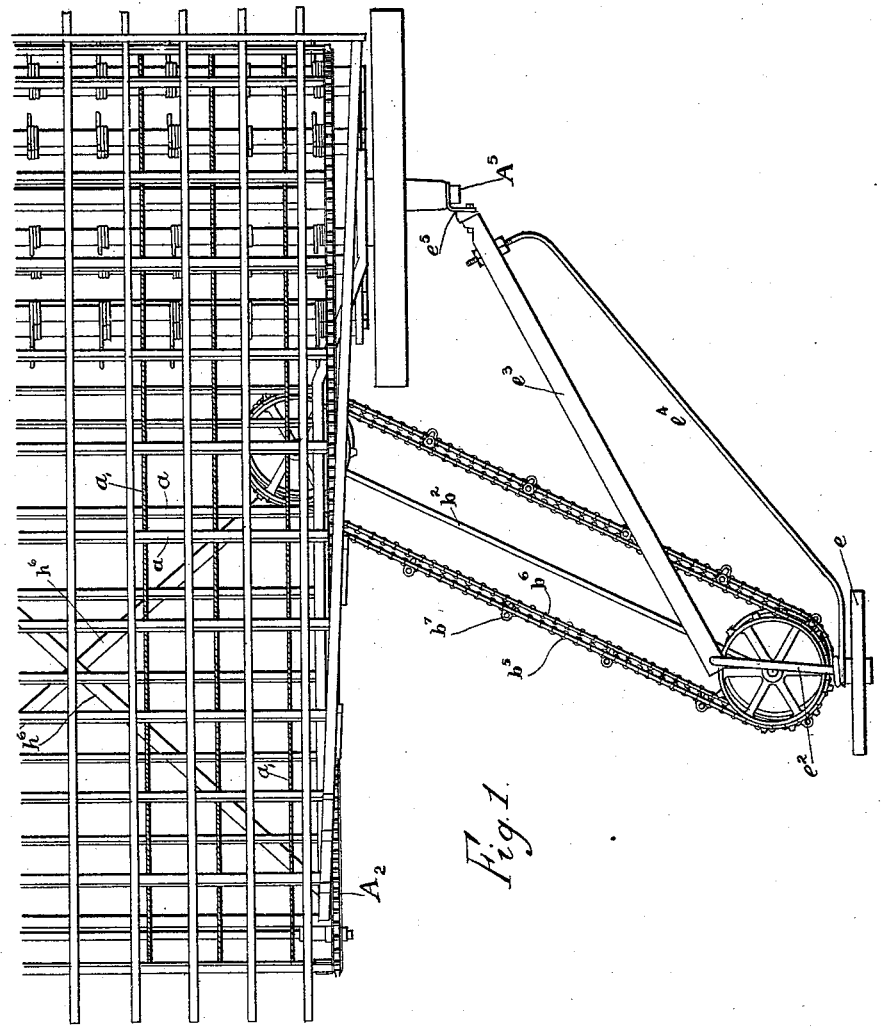
Figure 4:
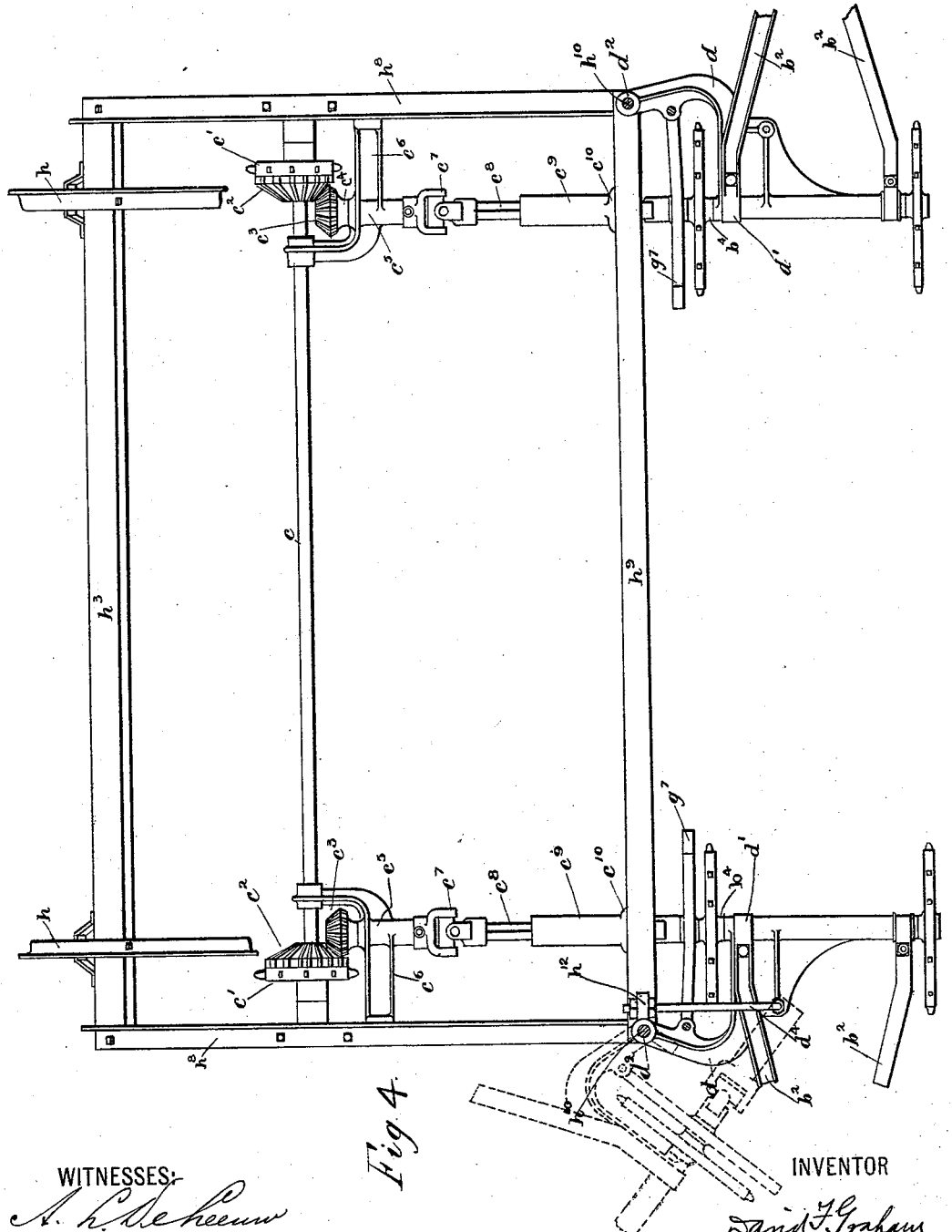

In the accompanying drawings, Figure 1 is a plan view of a portion of a device embodying my invention; this view illustrating one half of the machine only; the remaining half being a substantial duplicate of the one represented; that is to say, both sides of the machine are, for all practical purposes, alike. Fig. 2 is a side elevation of the same. Fig. 3 is a side elevation of a portion of the top of the loader on an enlarged scale. Fig. 4 is a rear elevation partly in section of a portion of the machine. Fig. 5 is a side elevation of the main frame in detail. Figs. 6 and 7 are details of the same. Fig. 8 is a side elevation showing a portion of the rakes and the method of attaching same to the main frame, the rake in this case being thrown round at right angles to the main frame. Figs. 9 and 10 are details, showing the method of adjusting the upper portion of the loader frame to secure the proper tension on the carrier. Figs. 11 and 12 are respectively a plan partly in section, and a side elevation partly in section of the loading device. Fig. 13 is a detail of a portion of the same, showing the clutches throwing the loader into and out of gear. Figs. 14 and 15 are details of the raking teeth. Figs. 16 and 17 are details of the rakes showing the cams for operating the rake teeth. Fig. 18 is a transverse view of one of the raking devices taken at right-angles to the direction of the travel of said chain.

Like parts are represented by similar letters and figures of reference in the several views.

In the said drawings A, A, represent a hay loader, which consists essentially of an endless carrier A', preferably formed at each side with sprocket chains $A^2$, to which are connected transverse slats $a$, connected together by endless ropes or cables $a'$. This endless carrier passes at the top over suitable supporting wheels $a^3$, on a transverse shaft $a^4$, and at the bottom passes around a cylinder $A^3$, having on each side sprocket wheels $A^4$, over which the chain $a^2$, passes. This cylinder $A^3$, is supported on and revolves about the main axle $A^5$, which is supported and carried by the main carrying wheels $A^6$.

B, B, represent the side delivery raking devices, which are connected to each side of the machine and extend laterally and forwardly therefrom at an angle to the line of draft. These raking devices consist essentially of skeleton frames formed of vertical boxes $b$, $b'$, connected together by cross braces $b^2$, $b^2$. The respective boxes $b$, $b'$, contain vertical shafts $b^3$, $b^4$, which are journaled in said boxes and carry at their respective ends sprocket wheels over which pass sprocket chains $b^5$, $b^6$. Means are provided by which the boxes $b$, $b'$, may be moved to or from each other to provide for tightening or loosening the chains $b^5$, $b^6$. This is preferably accomplished by sliding the ends of the braces $b^2$, $b^2$, where the retaining bolts which secure said braces to one or both of said boxes pass through, as illustrated in Fig. 8. At suitable intervals in the length of the respective chains $b^5$, $b^6$, there are provided links having bearing boxes $b^7$, and $b^8$, adapted to receive and support vertical rods $b^9$, which carry at the bottom flexible teeth $b^{10}$, in the manner hereinafter more fully specified.

The loader A, A, is provided at the bottom and slightly above the cylinder $A^3$, with a transverse shaft $c$, having at each end a sprocket wheel $c'$, over which the sprocket chains $A^2$, pass. This shaft $c$, is further provided at each end with a beveled gear $c^2$, adapted to mesh with a beveled pinion $c^3$, on a shaft $c^4$, supported and turning in a bearing $c^5$, on a bracket $c^6$, which is connected to the main frame of the loader. The shaft $c^4$, is provided with a universal jointed coupling $c^7$, to which is connected a tumbling shaft having telescoping parts $c^8$, $c^9$; the part $c^8$, being square in cross section and adapted to fit in a correspondingly shaped sleeved portion $c^9$. This tumbling shaft is connected by a universal coupling $c^{10}$, to the driving shaft $b^4$, of the rakes. The inner end of the rake is supported by a bracket $d$, hinged at $d'$, to the bearing box $b'$, and at $d^2$, to a brace rod $h^{10}$, forming part of the frame of the loader; said bracket being supplemented by a brace $d^4$, also hinged to the shaft or rod $h^{10}$, through the medium of a sleeve $h^{12}$. The outer end of the rake B, is carried by a supporting wheel $e$, journaled on a projecting stud $e'$, at the bottom of a supporting arch $e^2$, which is connected at one end to the braces $b^2$, $b^2$, and passing over the sprocket chains, carries the stud $e'$. A brace $e^3$, is extended from the main axle $A^5$, to the arch piece $e^2$, which carries the supporting wheel $e$; a supplemental brace $e^4$, being preferably provided, which extends from the main brace $e^3$, and connects with the arch $e^2$, at or near the point where the stud $e'$, projects therefrom. The brace $e^3$, is preferably connected to the main axle $A^5$, by means of an angle piece $e^5$, which is secured rigidly to said brace and journaled on said axle. This construction is such that when desired the rakes B, may be raised vertically, and turning on the hinged portions $d'$, $d^2$, and $e^5$, be brought to a substantially vertical position at the side of the loader, where they may be held by any suitable fastening devices. The raising of the loader upon its hinged supports, as described, causes the telescoping parts $c^8$, $c^9$, of the tumbling shaft to become disengaged, and thus disengages the rakes so raised from their driving mechanism and allows it to remain inoperative while the other parts are free to operate as before.

The raking devices are so constructed that the supporting shafts for the sprocket chains $b^5$, $b^6$, stand slightly at an angle; the upper ends being inclined toward the direction of travel of the loader, so that the teeth on that side of the rake, which is in advance, are brought closer to the ground than those which are in the rear.

The cylinder $A^3$, of the loader, is of a skeleton construction, and cross bars $f$, which extend from one sprocket wheel to the other, are journaled in suitable bearings $f'$, in each of said sprocket wheels. The main axle $A^5$, revolves but has loosely mounted thereon at each end a stationary cam $f^2$, in which are adapted to travel friction rollers $f^3$, on the ends of pivoted links $f^4$; the opposite ends of said links being pivoted to the arms on the sprocket wheel. Through the links $f^4$, connecting arms $f^5$, extend to the bars $f$, to which they are connected through the medium of small projecting arms $f^6$, so that as the sprocket wheel is revolved, the bars $f$, are given a rocking motion in their bearings through the operation of the cam $f^2$. Each alternate bar is operated through the opposite ends of the machine, so that each cam operates one half of the bars only. These bars are provided throughout their length with projecting teeth $f^7$, which are, by the action in the cam, projected as they approach the lower side of the cylinder; the action of the cam being such as to turn said teeth forwardly and downwardly as they rise from the bottom of the loader until they reach the point at which the endless carrier departs from the cylinder on a tangential line; when they are gradually withdrawn to within the periphery of the cylinder; the operation being to grasp the hay and bind it firmly against the endless carrier as the cylinder revolves, after which it is carried by the endless carrier and deposited on the wagon.

It sometimes happens that in long, straight hay, such as timothy, the teeth moving in vertical planes will not grasp the hay sufficiently to gather it all onto the cylinder. To obviate this I provide for effecting a longitudinal movement of each of the transverse bars $f$, as they are oscillated, which causes the teeth to move in a line slightly across the hay and thus insure a more perfect grasp thereon. This is accomplished by providing at each end of the bearings $f'$, cam faces $f^8$, adapted to contact with projecting lugs or pins $f^9$, in the ends of the bars $f$, so that as the bars are rocked in their journals, they are also caused to move longitudinally through said journals. These cam faces are so arranged that each alternate bar moves in the opposite direction and thus causes the fingers to cross the vertical planes in which they should operate, and insures a perfect grasp on the hay which may lie perfectly straight in the direction of travel of the loader.

The device is adapted to be hitched to the rear of a wagon or other vehicle by means of a hitch connection C. As the wagon is drawn forward, the revolution of the driving wheels causes the sprocket wheels to be revolved, carrying with them the endless chain and the endless carrier. The movement of the sprocket chain $A^2$, revolves the transverse shaft $c$, which imparts motion through the beveled gears and tumbling shaft to the endless chains $b^5$, $b^6$, of the raking devices. The raking devices moving laterally across the surface traversed by said rake, carry the hay or other material directly in the path of the loader, where it is grasped by the teeth and carried onto the wagon.

The rake teeth $b^{10}$, preferably consist of flexible wires coiled about a wrist $g$, in a movable frame $g'$, which frame is hinged to a pin $g^2$, carried in a bifurcated head $g^3$, on the end of the rods $b^9$. These heads $g^3$, as well as the frames $g'$, are adapted to slide in the bearings $b^8$, connected to the chain $b^6$, and when in position in said bearings, are held rigidly together. A spring $g^5$, arranged on the rod $b^9$, so as to rest at one end against a collar $g^6$, on said rod and at the other end on the top of said bearing $b^8$, is adapted to normally hold the sliding head $g^2$, in said bearing. The rods $b^9$, are further provided at the top with a bearing $b^{11}$, adapted, as the rods successively come within the main frame of the loader, to contact with a cam $g^7$, which forces said rods downwardly and thus releases the frame $g'$, and permits it to turn on its bearings so as to discharge the rakings carried by said teeth to this position.

The main frame of the loader is preferably of a skeleton structure, and in order to secure the proper strength and at the same time retain the desirable amount of lightness, it is built up and braced in a peculiar manner. Extending upwardly and forwardly at an angle on each side are angle iron bars $h$. These bars are attached at their lower ends to the main axle box $h'$, and at the upper ends to clamping boxes, $h^2$. The cross bar $h^3$, preferably of wood connects to the two side bars $h$, and at each end of this cross bar $h^3$, are brackets or stands $h^4$, over which are extended brace rods or bars $h^5$, which are also connected at one end to the bearing boxes $h'$, and at the other to the clamping boxes $h^2$. Diagonal braces $h^6$, extend from near each end of the cross bar $h$, to opposite clamping boxes $h^2$. The upper shaft $a^4$, is supported in bearings on sliding rods $h^7$, which are clamped in the clamping boxes $h^2$, in which they may be secured in any position of adjustment within the length of said rods thus permitting the shaft $a^4$, to be adjusted to or from the main driving axle so as to regulate the tension on the movable carrier at will.

Depending from the cross bar $h^3$, are vertical standards $h^8$, connected together at their lower end by a cross bar $h^9$. This cross bar $h^9$, is secured to the vertical standard $h^8$, by brace rods $h^{10}$, said brace rods being each screw threaded and provided with a nut $h^{11}$, at one side of the standard $h^8$, a collar $h^{12}$, being placed on the said rod on the opposite side of the bar $h^9$. Extending forwardly and inwardly from the collar $h^{12}$, is a brace rod $h^{13}$, which is provided at one end with an eye which fits on the brace rod $h^{10}$ and is secured thereto by a nut $h^{14}$. This brace rod $h^{13}$, is turned up at its outer end and passes through an eye plate $h^{15}$, and through the perforated end of a brace $h^{16}$, which extends upwardly at an angle and passes through the standard $h^8$, and the cross bar $h^3$, the upper end being bent at an angle as shown, and screw threaded to receive clamping nuts $h^{17}$ and $h^{18}$, which serve to connect the standards $h^8$ to the bar $h^3$. The eye plate $h^{15}$, forms a hitch for the machine and is adapted to be connected directly to the rear end of a wagon or other vehicle to which the loader is to be attached. By the employment of the rods $h^{13}$ and $h^{10}$, a direct connection is established from the eye plate $h^{15}$, to the main axle boxes $h'$. The rakes are connected directly to the standard $h^8$, and braced backwardly by the brace rods $e^3$ and $e^4$ to the main axle from their outer end and by the brace rod $h^{10}$ from their inner end. It will thus be seen that in side elevation the main frame presents a skeleton structure consisting of four triangles marked 2, 3 and 4 (see Fig. 5) all of which are so connected and braced together that a construction of great rigidity and strength is secured.

In order to provide for disconnecting the loader from the driving wheels when desired for transportation from place to place or for other reasons, I construct upon each of the hubs of the driving wheels a recessed portion $k$, having inwardly projecting teeth $k'$. At the side of the wheel is a disk $k^2$, which forms a cover for the recess portion $k$, said disk being rigidly secured to the axle. The wheels being journaled loosely on the axle the disk $k^2$, is perforated to receive a projecting trunnion formed on movable pawls $k^3$, $k^3$, which pawls when turned to one position are adapted to engage with the teeth $k'$, in the wheels, and thus connect said wheels to the axle, causing them to revolve together. The pawls are further provided on the outside of the disk $k^2$, with projecting arms $k^4$, formed of resilient metal, said arms being adapted when in either position of adjustment to engage in notches formed in the disk to hold them in the different positions of adjustment, the arms being also adapted to act in the nature of a spring to permit the pawls to move away from the hub when the wheels are moved in a backward direction.

A brief description of the operation of the machine as thus described is as follows: The device being connected to the rear of a wagon or other vehicle, and the pawls thrown into engagement with the carrying wheels the cylinder is caused to revolve carrying with it the endless carrier. As the cylinder revolves, the cams operate the transverse bars and the projecting teeth on said cylinder forming a gathering device which gathers the hay in the line of travel of said cylinder, the carrier elevating the hay to the top of the main frame and depositing it onto a wagon, the raking devices being connected in their working position are also caused to revolve so that the teeth move laterally in a direction toward the loader thus carrying the hay into the line of travel of the gathering cylinder. It will be seen that not only will the hay which lies entirely in the line of the loader be gathered up, but also all the hay within the reach of the respective raking devices and again elevated to a position on the wagon.

It will be seen that a device as above described accomplishes at once the act of raking hay and of elevating it onto a wagon or other vehicle by which it may be conveyed from the field.

Having thus described my invention, I claim—

1. In a hay rake and loader, a main frame and gathering devices thereon, a carrier operating in connection with said gathering devices, raking devices connected to said main frame and having endless chains each supported at an angle to the ground line, said chains being provided with projecting teeth, as described, and means for revolving said chains to cause the teeth to discharge their rakings in the line of travel with the gathering devices, substantially as specified.

2. In a hay rake and loader, the combination with a gathering device, and a carrier operating in connection with said gathering device, of side delivery raking devices arranged at the side of and in front of said gathering device, said raking devices consisting essentially of endless flexible supports having teeth mounted thereon, the said supports being arranged at an angle to the ground line, means for operating the same to cause the teeth to move toward the gathering device, substantially as specified.

3. The combination with a hay loader, of side delivery rakes connected to the frame of said hay loader and extending in opposite directions on each side of the same, said rakes consisting essentially of endless chains having teeth thereon, said chains being arranged at an angle to the ground line, and means, as described, for simultaneously operating the rakes and loader from the wheels supporting said frame, substantially as specified.

4. The combination with a hay loader, of raking devices secured to the side thereof by hinged connections, as described, a two-part driving connection from said loader to said raking devices, and means, as described, for disengaging the parts of said driving connection when the raking device is turned on its hinged connection, substantially as specified.

5. A hay loader consisting of a gathering device, and a carrier extending therefrom, raking devices hinged on the respective sides of said hay loader, each consisting essentially of a frame and endless chains having laterally moving teeth, a two-part driving connection from the driving wheels of said loader to the sprocket wheels of each of said raking chains, and means, substantially as described, for disengaging the parts of said driving connection when the raking device is turned on its hinged connection, substantially as specified.

6. The combination with a main frame, a main axle and supporting wheels on which said frame is supported, of raking devices hinged to said main frame, and extending from opposite sides thereof, each of said raking devices consisting essentially of a frame having endless chains with raking teeth thereon, said chains being arranged at an angle to the ground line as described, a two-part driving connection from the supporting wheels to each of said raking devices, and means, as described, for disengaging the parts of said driving connection when its raking device is turned on its hinged connection, substantially as specified.

7. The combination with the main axle, a main frame supported thereon, and driving wheels on said axle, raking devices extending from opposite sides of said frame, and a driving connection from said supporting wheels to said raking devices, said raking devices each having a frame supporting endless chains at an angle to the ground line and having raking teeth, a supporting wheel on the outer end of each of said raking frames, and a brace extending from said supporting wheel and hinged to a main axle, substantially as specified.

8. In a hay loader, a cylinder having a series of oscillating bars on the periphery thereof, each of said bars having projecting teeth and an endless carrier consisting of lateral bars and flexible connecting strip adapted to pass round said cylinder cams for oscillating said cylinder bars, and means substantially as described for simultaneously producing a longitudinal movement of said bars as the same are oscillated, substantially as described.

9. In a hay loader the gathering cylinder having peripheral transverse bars, each bar being provided with a series of teeth and adapted to oscillate in said cylinder means for oscillating said bars as the cylinder is revolved, and cam projections on said cylinder adapted to produce a longitudinal movement on said bars when same are oscillating, substantially as set forth.

10. In a hay loader, a gathering cylinder having a series of peripheral transverse bars, each of said bars being journaled in said cylinder so as to oscillate thereon, and each provided with a series of projecting teeth, means for oscillating said bars as the cylinder is revolved and cam projections on said cylinder adapted to produce a longitudinal movement of each alternate bar in opposite directions as the said bars are oscillated substantially as specified.

11. The combination with the main frame the axle and supporting wheels of a raking device connected to said main frame consisting essentially of endless chains having projecting teeth, said frames being adapted to extend laterally from said main frame, and arranged at an angle so that the forward line of said endless chains shall be depressed below the rearward line of the same, substantially as set forth.

12. The combination with the rake supporting frame, the endless chains thereon having the movable teeth as described, a supporting wheel adjustably connected to the outer end of said frame and means as described for securing said frame in different positions of adjustment with reference to said wheel as specified.

13. A raking frame consisting essentially of vertical bearing boxes connected together by cross braces as described, a bracket hinged to one of said bearing boxes and also to the main supporting frame, sprocket wheels supported in said boxes and teeth-carrying chains on the said sprocket wheels and a "U" shaped support connected to one end of said raking frame, and a wheel on said "U" shaped support, substantially as set forth.

14. The combination with the rake supporting frame, the endless chains thereon having movable teeth as described, said frame being hinged at one end and provided at the other with a supporting wheel adjustably connected to said frame, and means, substantially as described, for securing said frame in different positions of adjustment with reference to said wheels, substantially as specified.

15. The combination with a main frame and supporting wheels, of a raking device connected to said main frame consisting essentially of an endless chain supported in a plane at an angle to the ground line and provided with projecting teeth, as described, and means for revolving said chain from the main supporting wheels, substantially as specified.

16. The combination with the rake supporting frame, and the endless chains thereon of movable bars or standards supported in bearings on said chains, hinged teeth on the ends of said bars, a supporting frame on one of the said chains, adapted to support said hinged teeth when in their normal position, and a cam for moving said bars to permit said teeth to turn to an unusual position, substantially as set forth.

17. The combination with the supporting frame and the endless chains supported thereon, of the vertical rods supported in bearings on said chains, hinged teeth connected to said rods and a frame on one of said chains normally inclosing the hinged connection of each of the said teeth; a spring for retaining said tooth in its normal position, and a cam for moving said rod to an unusual position to cause said tooth to be deflected angularly, substantially as described.

18. The combination of endless chains and the tooth supporting rods having bearings in said chains, a spring actuated supporting head pivoted to each of said rods, and a flexible tooth supported in said head; a supporting frame adapted to hold said head in line with said rod when in a normal position, and means substantially as described for operating said rod longitudinally to cause said tooth to assume different angular positions, substantially as described.

19. The combination with the main frame and the driving shaft thereon, a hinged bracket connected to said frame and carrying a cam, a bearing box hinged to said bracket and a sprocket wheel supported in the said bearing box, adjacent to said cam, an adjustable driving connection from said driving shaft to said sprocket wheel, an endless chain on the said sprocket wheel carrying movable raking teeth, said teeth being adapted to be operated by said cam, substantially as set forth.

20. The combination with the main frame and the driving shaft thereon, a hinged bracket connected to said frame, and a bearing box hinged to said bracket, a sprocket wheel supported in said bearing box and a cam adjacent to said sprocket wheel supported on said bracket, a detachable tumbling shaft connection from said driving shaft to said sprocket wheel, endless chains carrying hinged raking teeth operated by said sprocket wheel, said teeth being loosely connected to said chains so as to be operated by said cams substantially as specified.

In testimony whereof I have hereunto set my hand this 20th day of November, A. D. 1893.

DAVID F. GRAHAM.

Witnesses:
A. L. DE LEEUW,
CHAS. I. WELCH.